(12) United States Patent
Zhou et al.

(10) Patent No.: US 10,894,670 B1
(45) Date of Patent: Jan. 19, 2021

(54) MOVABLE BELT BREAKAGE PREVENTION AND CATCHING SYSTEM FOR BELT CONVEYOR

(71) Applicants: CHINA UNIVERSITY OF MINING AND TECHNOLOGY, Xuzhou (CN); XUZHOU ZHIRUN MINING EQUIPMENT SCIENCE AND TECHNOLOGY CO., LTD, Xuzhou (CN); INNER MONGOLIA UNIVERSITY OF TECHNOLOGY, Hohhot (CN)

(72) Inventors: Gongbo Zhou, Xuzhou (CN); Zhencai Zhu, Xuzhou (CN); Ying Wang, Xuzhou (CN); Yuan Sun, Xuzhou (CN); Ping Zhou, Xuzhou (CN); Chaoquan Tang, Xuzhou (CN); Gang Shen, Xuzhou (CN); Wei Li, Xuzhou (CN); Guohua Cao, Xuzhou (CN); Yuxing Peng, Xuzhou (CN); Xiang Li, Xuzhou (CN); Xin Zhang, Xuzhou (CN)

(73) Assignees: CHINA UNIVERSITY OF MINING AND TECHNOLOGY, Xuzhou (CN); XUZHOU ZHIRUN MINING EQUIPMENT SCIENCE AND TECHNOLOGY CO., LTD, Xuzhou (CN); INNER MONGOLIA UNIVERSITY OF TECHNOLOGY, Hohhot (CN)

( * ) Notice: Subject to any disclaimer, the term of this patent is extended or adjusted under 35 U.S.C. 154(b) by 0 days.

(21) Appl. No.: 16/609,757

(22) PCT Filed: Sep. 21, 2018

(86) PCT No.: PCT/CN2018/106899
§ 371 (c)(1),
(2) Date: Oct. 31, 2019

(87) PCT Pub. No.: WO2020/000710
PCT Pub. Date: Jan. 2, 2020

(30) Foreign Application Priority Data

Jun. 27, 2018 (CN) .......................... 2018 1 0678530

(51) Int. Cl.
*B65G 43/06* (2006.01)
*B65G 43/02* (2006.01)
(Continued)

(52) U.S. Cl.
CPC .............. *B65G 43/02* (2013.01); *F15B 11/16* (2013.01); *G05B 19/4155* (2013.01);
(Continued)

(58) Field of Classification Search
CPC ............................... B65G 43/02; B65G 43/06
(Continued)

(56) References Cited

U.S. PATENT DOCUMENTS 6,131,727 A * 10/2000 Nelson ................... B65G 43/02
198/810.02
6,291,991 B1 * 9/2001 Schnell .................. B65G 43/02
324/235

(Continued)

FOREIGN PATENT DOCUMENTS

CN 101148222 A 3/2008
CN 201534707 U 7/2010
(Continued)

*Primary Examiner* — Douglas A Hess
(74) *Attorney, Agent, or Firm* — Bayramoglu Law Offices LLC

(57) ABSTRACT

A movable belt breakage prevention and catching system for a belt conveyor includes a detection device, two tracks, a plurality of catching devices, and a control system. The detection device is mounted on the belt conveyor, and is configured to detect whether a belt of the belt conveyor has a crack. The two tracks are symmetrically arranged on both sides of the belt conveyor, and the plurality of catching devices are symmetrically arranged on the two tracks. The (Continued)

control system is configured to control the plurality of catching devices to simultaneously catch the belt firmly when the detection device detects that the belt has a crack; and after firmly catching the belt, each catching device is able to unidirectionally move along with the belt along the track where the catching device is positioned.

18 Claims, 7 Drawing Sheets

(51) Int. Cl.
    *F15B 11/16*      (2006.01)
    *G05B 19/4155*    (2006.01)
(52) U.S. Cl.
    CPC .............. *B65G 2203/0275* (2013.01); *B65G 2203/042* (2013.01); *F15B 2211/21* (2013.01); *F15B 2211/71* (2013.01); *G05B 2219/45054* (2013.01)
(58) Field of Classification Search
    USPC ....................................... 198/810.01, 810.02
    See application file for complete search history.

(56)               References Cited

U.S. PATENT DOCUMENTS

| | | | |
|---|---|---|---|
| 6,814,220 B1 * | 11/2004 | Nieuwoudt | B65G 15/00 198/323 |
| 7,274,971 B2 * | 9/2007 | Brill | G05B 19/4189 700/230 |
| 7,275,637 B2 * | 10/2007 | Brown | B65G 43/02 198/502.1 |
| 7,347,317 B2 * | 3/2008 | Aizawa | B65G 43/02 198/690.1 |
| 8,151,974 B2 * | 4/2012 | Flury | F16H 19/06 198/468.2 |
| 8,157,085 B2 * | 4/2012 | Furukawa | B65G 43/00 198/810.03 |
| 8,330,452 B2 * | 12/2012 | Furukawa | B65G 43/02 324/207.11 |
| 8,763,784 B2 * | 7/2014 | Ziegler | B65G 43/10 198/460.1 |
| 9,221,610 B2 * | 12/2015 | Enshu | B65G 15/34 |
| 9,240,115 B2 * | 1/2016 | Omura | G08B 21/00 |
| 9,533,831 B2 * | 1/2017 | Nelson | B65G 43/02 |
| 9,988,217 B2 * | 6/2018 | Hou | B65G 43/02 |
| 10,189,649 B2 * | 1/2019 | Kuesel | B65G 43/02 |
| 10,377,574 B2 * | 8/2019 | Hou | B65G 43/02 |
| 10,737,888 B1 * | 8/2020 | MacArthur | B65G 9/006 |

FOREIGN PATENT DOCUMENTS

| | | |
|---|---|---|
| CN | 201647617 U | 11/2010 |
| CN | 103508177 A | 1/2014 |
| CN | 103708207 A | 4/2014 |
| SU | 1214556 A1 | 2/1986 |
| SU | 1661099 A1 | 7/1991 |

* cited by examiner

MOVABLE BELT BREAKAGE PREVENTION AND CATCHING SYSTEM FOR BELT CONVEYOR

CROSS-REFERENCES TO THE RELATED APPLICATIONS

This application is the national phase entry of International Application No. PCT/CN2018/106899, filed on Sep. 21, 2018, which is based upon and claims priority to Chinese Patent Application No. 201810678530.X, filed on Jun. 27, 2018, the entire contents of which are incorporated herein by reference.

TECHNICAL FIELD

The present invention relates to the field of protection against belt breakage for a belt conveyor, and in particular, to a movable belt breakage prevention and catching system for a belt conveyor.

BACKGROUND

Belt conveyors are widely applied in various fields. During running of a belt conveyor, a belt is likely to have a crack. As the belt runs, the crack gets bigger. The belt is broken when the crack is enlarged to a certain extent. Therefore, according to whether the belt has a crack, it may be determined whether the belt is about to break. The belt naturally falls after it is broken, and the conveyor is likely to rotate reversely.

If a fully loaded belt conveyor has a belt breakage failure, the belt on the upper and lower sides may fall to the bottom of a tunnel, and cover up the machine tail together with conveyed materials, which causes great harm to the apparatus. In addition, the belt may irregularly swing during falling, which brings irreducible damage to the conveyor belt, and further brings damage of varying degrees to one side tube, support rollers 22, and other parts. Worse still, the belt out of control may damage facilities such as surrounding cables, pipes, etc., destroy the circuit and the entire production line, or cause a fire; and even endanger personal safety, causing heavy damage to production.

A currently used broken belt catching mechanism mainly has the following problems: First, all the existing catching mechanisms carry out catching only after the belt is broken, and there is no prevention mechanism or system which carries out catching when the belt has a sign of breakage. Secondly, all the existing catching mechanisms are stationary. That is, the catching mechanism is fixed on the conveyor or another apparatus, and cannot move with the belt conveyor. Therefore, the whole conveyor needs to be shut down after the catching operation, and then the materials are manually removed from the belt of the whole conveyor, so as to repair the belt. The whole process takes a lot of time and seriously affects the production efficiency of enterprises.

SUMMARY

In order to solve the prior-art problems of catching a belt only after the belt is broken, shutting down the whole belt conveyor after the catching, and manually removing materials, the present invention provides a movable belt breakage prevention and catching system for a belt conveyor, which comprises a detection device, two tracks, a plurality of catching devices, and a control system, wherein the detection device is mounted on the belt conveyor, and is configured to detect whether a belt of the belt conveyor has a crack;

the two tracks are symmetrically arranged on both sides of the belt conveyor, and the plurality of catching devices are symmetrically arranged on the two tracks; and the control system is configured to control the plurality of catching devices to simultaneously catch the belt firmly when the detection device detects that the belt has a crack; and after firmly catching the belt, each catching device is able to unidirectionally move along with the belt along the track where the catching device is positioned.

Each of the catching devices includes a catching mechanism and a movable mechanism;

the catching mechanism includes a mounting bracket, an upper pressing plate, a lower pressing plate, and a drive mechanism located on the mounting bracket; the upper pressing plate and the lower pressing plate are both connected to the drive mechanism, and the upper pressing plate is positioned above the lower pressing plate;

the control system is able to control the drive mechanism to drive the upper pressing plate to move towards the lower pressing plate, and to drive the lower pressing plate to move towards the upper pressing plate, such that the upper pressing plate and the lower pressing plate firmly clamp the belt;

the control system is able to control the drive mechanism to drive the upper pressing plate to move away from the lower pressing plate, and to drive the lower pressing plate to move away from the upper pressing plate, such that the upper pressing plate and the lower pressing plate release the belt; and the mounting bracket is mounted on the movable mechanism, and the movable mechanism is able to unidirectionally move along the track.

The mounting bracket includes a bottom plate and two vertical plates symmetrically mounted on the bottom plate, the two vertical plates being a first vertical plate and a second vertical plate;

the drive mechanism is mounted on the bottom plate;

the upper pressing plate includes an upper pressing plate body and a first connecting part; one end of the first connecting part is connected to one side of the upper pressing plate body, and the other end of the first connecting part is positioned between the two vertical plates; and the first connecting part is connected to the drive mechanism; and the lower pressing plate includes a lower pressing plate body, a second connecting part, and a third connecting part; one end of the second connecting part and one end of the third connecting part are connected to the same side of the lower pressing plate body; the other end of the second connecting part is hinged to one side of the first vertical plate that is far away from the second vertical plate; the other end of the third connecting part is hinged to one side of the second vertical plate that is far away from the first vertical plate; and the second connecting part and the third connecting part are both connected to the drive mechanism.

The drive mechanism includes a high-pressure tank, an electromagnetic valve arranged at an opening of the high-pressure tank, a master cylinder, a front cylinder, a first side cylinder, and a second side cylinder; the electromagnetic valve is connected to the master cylinder, the front cylinder, the first side cylinder, and the second side cylinder; the bottom end of the master cylinder is rotatably connected to the bottom plate, and an extension end of the master cylinder is rotatably connected to the other end of the first connecting part; the bottom end of the front cylinder is rotatably connected to the bottom plate, and an extension end of the front cylinder is hinged between the two ends of the first connecting part; the bottom end of the first side cylinder is rotatably connected to the bottom plate, and an extension end of the first side cylinder is hinged between the two ends of the second connecting part; and the bottom end of the second side cylinder is rotatably connected to the bottom plate, and an extension end the second side cylinder is hinged between the two ends of the third connecting part.

One surface of the lower pressing plate body that is far away from the upper pressing plate body is an arc surface.

The movable mechanism includes a slide rest, provided with three parallel slots at the bottom thereof; and a plurality of stop pawls is mounted in the middle slot, and a plurality of pulleys is mounted in the two slots on both sides; and a ratchet guide rail is provided in the middle of each track, and a pulley guide rail is provided on both sides; and the stop pawls are able to unidirectionally move along the ratchet guide rail, and the pulleys are able to roll along the pulley guide rails.

Every two adjacent ones of the movable mechanisms are connected via a connecting chain.

A catching device temporary storage case is provided on the tail end of each track.

The detection device includes a strain gauge, attached to the belt, and configured to measure a strain quantity of the belt in real time and transmit the actually measured strain quantity to the control system; the control system internally pre-stores an ultimate strain quantity of the belt, the ultimate strain quantity being a strain quantity when the belt has a crack; and when the actually measured strain quantity reaches the ultimate strain quantity, the control system controls the plurality of catching devices to firmly catch the belt at the same time.

The control system includes a plurality of control modules, a base station, and an upper computer; and each catching device is provided with one control module, and the control module includes a single chip microcomputer and a wireless communication module which are electrically connected; when the detection device detects that the belt has a crack, the upper computer transmits a control instruction by means of the base station and the wireless communication modules of the control modules; and according to the control instruction, the single chip microcomputer of each control module controls the catching device where the control module is positioned to firmly catch the belt.

By the foregoing technical solution, the present invention has the following advantageous effects in comparison with the prior art:

The movable belt breakage prevention and catching system for a belt conveyor in the present invention has a compact structure and low cost; is easily operated, arranged and maintained; and is safe and reliable. The detection device can detect whether the belt has a crack. If a crack is detected, it indicates that the belt has a breakage risk, and then the control system controls the plurality of catching devices to catch the belt having the crack. Thus, when a sign of breakage appears, the belt can be caught before it is broken. Moreover, after firmly catching the belt, the plurality of catching devices can continue to run along the tracks along with the belt. Therefore, it is not required to shut down the machine after the belt is caught, and materials can continue to be conveyed with the belt. The present invention solves the problems in the existing catching devices of shutting down the whole conveyor after catching is carried out and manually removing the materials from the belt of the whole conveyor. Therefore, the running of the belt is not affected after the belt is caught, saving a lot of manual discharge time.

BRIEF DESCRIPTION OF THE DRAWINGS

The present invention is further described below with reference to the accompanying drawings and embodiments.

MEANINGS OF NUMERALS IN THE FIGURES

Figure 1:
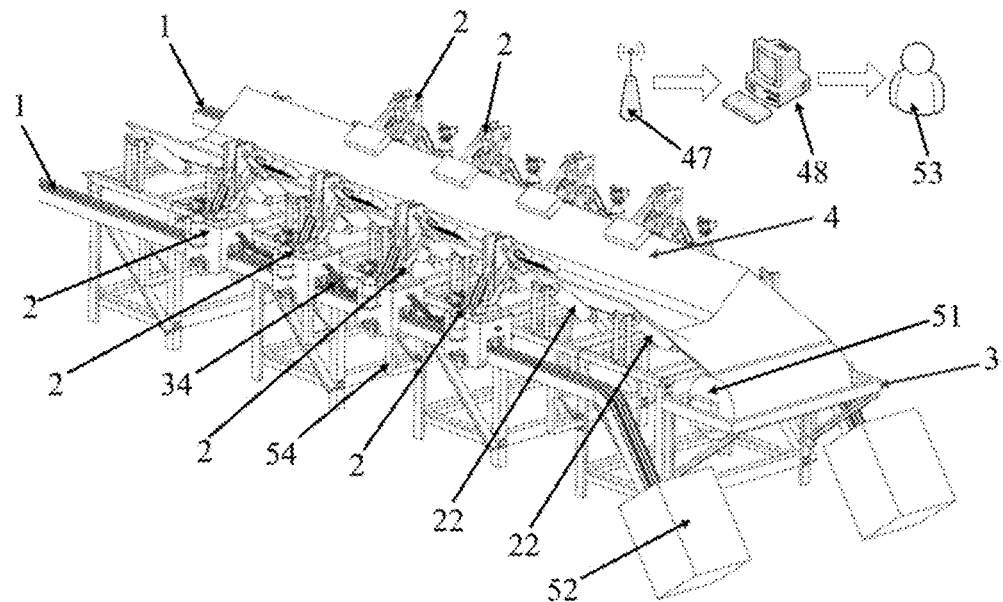
FIG. 1 shows an overall diagram of a movable belt catching system for a movable belt breakage prevention and catching system for a belt conveyor in the present invention.

1. Track, 2. Catching device, 3. Belt conveyor, 4. Belt, 5. Mounting bracket, 6. Upper pressing plate, 7. Lower pressing plate, 8. Bottom plate, 9. First vertical plate, 10. Second vertical plate, 11. Upper pressing plate body, 12. First connecting part, 13. Lower pressing plate body, 14. Second connecting part, 15. Third connecting part, 16. High-pressure tank, 17. Electromagnetic valve, 18. Master cylinder, 19. Front cylinder, 20. First side cylinder, 21. Second side cylinder, 22. Support roller, 23. First connecting plate, 24. Second connecting plate, 25. Third connecting plate, 26. Fourth connecting plate, 27. Slide rest, 28. Middle slot, 29. Stop pawl, 30. Slots on the two sides of the bottom of the slide rest, 31. Pulley, 32. Ratchet guide rail, 33. Pulley guide rail, 34. Connecting chain, 35. Roller mechanism, 36. L-shaped roller mounting bracket, 37. Rotation shaft, 38. Roller, 39. Fixing pin, 40. Limiting plate, 41. Square groove, 42. Connecting lug, 43. Hook-like connecting lug, 44. Movable connecting plate, 45. U-shaped bolt, 46. Control module, 47. Base station, 48. Upper computer, 49. Single chip microcomputer, 50. Wireless communication module, 51. Roller of the belt conveyor, 52. Catching device temporary storage case, 53. User, 54. Track mounting bracket, 55. Frame of the belt conveyor

DETAILED DESCRIPTION OF THE EMBODIMENTS

The present invention is further described in detail below with reference to the accompanying drawings. The accompanying drawings are simplified schematic views, and a basic structure of the present invention is described in a schematic manner. Therefore, only components related to the present invention are shown.

In the prior art, a belt is caught only after it is broken, and a belt conveyor needs to be shut down after the catching operation. To solve the foregoing problems, the present invention provides a movable belt breakage prevention and catching system for a belt conveyor, as shown in FIGS. 1 to 13. The movable belt breakage prevention and catching system for a belt conveyor includes a detection device, two tracks 1, a plurality of catching devices 2, and a control system.

The detection device is mounted on the belt conveyor 3, and is configured to detect whether a belt 4 of the belt conveyor 3 has a crack.

The two tracks 1 are symmetrically arranged on both sides of the belt conveyor 3, and the plurality of catching devices 2 are symmetrically arranged on the two tracks 1. The control system is configured to control the plurality of catching devices 2 to simultaneously catch the belt 4 firmly when the detection device detects that the belt 4 has a crack. After firmly catching the belt 4, each catching device 2 can unidirectionally move along with the belt 4 along the track 1 where the catching device is positioned.

The belt breakage prevention and catching system of the present invention can detect whether the belt 4 has a crack; and when detecting that the belt 4 has a crack, uses the control system to control the catching devices 2 to firmly catch the belt 4. After firmly catching the belt, the catching devices 2 can move along the tracks 1 along with the belt 4. Therefore, the system of the present invention can catch the belt 4 in time before it is broken, to prevent the crack on the belt 4 from getting bigger and further avoid sudden belt breakage. Thus, the present invention achieves the effect of belt breakage prevention. By use of such a belt breakage prevention and catching system, the belt conveyor 3 can continue to run after the catching operation, and is shut down for maintenance after materials in front of the crack on the belt 4 are conveyed to a next apparatus. Therefore, the system does not affect current material conveyance after the catching operation. Thus, the present invention solves the problems in the existing catching devices of shutting down the whole conveyor after catching is carried out and manually removing the materials from the belt of the whole conveyor, thus saving a lot of material removal time, shortening the maintenance cycle, and improving production efficiency of enterprises.

In the present invention, each catching device 2 includes a catching mechanism and a movable mechanism.

The catching mechanism includes a mounting bracket 5, an upper pressing plate 6, a lower pressing plate 7, and a drive mechanism located on the mounting bracket 5. The upper pressing plate 6 and the lower pressing plate 7 are both connected to the drive mechanism, and the upper pressing plate 6 is positioned above the lower pressing plate 7.

When the detection device detects that the belt 4 has a crack, the control system can control the drive mechanism to drive the upper pressing plate 6 to move towards the lower pressing plate 7, and to drive the lower pressing plate 7 to move towards the upper pressing plate 6, such that the upper pressing plate 6 and the lower pressing plate 7 firmly clamp the belt 4.

For the catching device 2 which moves to the tail of the belt conveyor 3 along with the belt 4, the control system can control the drive mechanism of the catching device 2 to drive the upper pressing plate 6 to move away from the lower pressing plate 7, and to drive the lower pressing plate 7 to move away from the upper pressing plate 6, such that the upper pressing plate 6 and the lower pressing plate 7 release the belt 4.

The mounting bracket 5 is mounted on the movable mechanism, and the movable mechanism can unidirectionally move along the track 1.

The mounting bracket 5 includes a bottom plate 8 and two vertical plates symmetrically mounted on the bottom plate 8. The two vertical plates are a first vertical plate 9 and a second vertical plate 10.

The drive mechanism is mounted on the bottom plate 8.

The upper pressing plate 6 includes an upper pressing plate body 11 and a first connecting part 12. One end of the first connecting part 12 is connected to one side of the upper pressing plate body 11, and the other end of the first connecting part 12 is positioned between the two vertical plates. The first connecting part 12 is connected to the drive mechanism.

The lower pressing plate 7 includes a lower pressing plate body 13, a second connecting part 14, and a third connecting part 15. One end of the second connecting part 14 and one end of the third connecting part 15 are connected to the same side of the lower pressing plate body 13. The other end of the second connecting part 14 is hinged to one side of the first vertical plate 9 that is far away from the second vertical plate 10. The other end of the third connecting part 15 is hinged to one side of the second vertical plate 10 that is far away from the first vertical plate 9. The second connecting part 14 and the third connecting part 15 are both connected to the drive mechanism. The drive mechanism can drive the upper pressing plate body 11 and the lower pressing plate body 13 to firmly clamp the belt 4.

The drive mechanism includes a high-pressure tank 16, an electromagnetic valve 17 arranged at an opening of the high-pressure tank 16, a master cylinder 18, a front cylinder 19, a first side cylinder 20, and a second side cylinder 21. The electromagnetic valve 17 is connected to the master cylinder 18, the front cylinder 19, the first side cylinder 20, and the second side cylinder 21 via pipes. The control system can control the electromagnetic valve 17 to supply air to the master cylinder 18, the front cylinder 19, the first side cylinder 20, and the second side cylinder 21, so as to drive the four cylinders to extend or retract.

The bottom end of the master cylinder 18 is rotatably connected to the bottom plate 8, and an extension end of the master cylinder 18 is rotatably connected to the other end of the first connecting part 12.

The bottom end of the front cylinder 19 is rotatably connected to the bottom plate 8; and an extension end of the front cylinder 19 is hinged between the two ends of the first connecting part 12 and may be hinged on the middle portion of the first connecting part 12.

The bottom end of the first side cylinder 20 is rotatably connected to the bottom plate 8; and an extension end of the first side cylinder 20 is hinged between the two ends of the second connecting part 14 and may be hinged on the middle portion of the second connecting part 14.

The bottom end of the second side cylinder 21 is rotatably connected to the bottom plate 8; and an extension end of the second side cylinder 21 is hinged between the two ends of the third connecting part 15 and may be hinged on the middle portion of the third connecting part 15.

When it is required to firmly clamp the belt 4, the control system controls the master cylinder 18 to extend and the front cylinder 19 to retract, such that the upper pressing plate body 11 moves towards the lower pressing plate body 13.

Simultaneously, the control system controls the first side cylinder 20 and the second side cylinder 21 to extend, such that the lower pressing plate body 13 moves towards the upper pressing plate body 11. Thus, the upper pressing plate body 11 and the lower pressing plate body 13 together clamp the belt 4 firmly. By means of the four cylinders to drive the upper pressing plate body 11 and the lower pressing plate body 13 to firmly clamp the belt 4, it can be guaranteed that a sufficient clamping force is generated by the upper pressing plate body 11 and the lower pressing plate body 13. Further, a plurality of protrusions may be provided on both one surface of the upper pressing plate body 11 that contacts the belt 4 and one surface of the lower pressing plate body 13 that contacts the belt 4, so as to enhance friction between the upper pressing plate body 11 and the belt 4, and between the lower pressing plate body 13 and the belt 4.

When the catching device 2 moves to the tail of the belt conveyor 3 along with the belt 4, the control system controls the master cylinder 18 to retract and the front cylinder 19 to extend, such that the upper pressing plate body 11 moves away from the lower pressing plate body 13. Simultaneously, the control system controls the first side cylinder 20 and the second side cylinder 21 to retract, such that the lower pressing plate body 13 moves away from the upper pressing plate body 11. Thus, the upper pressing plate body 11 and the lower pressing plate body 13 release the belt 4.

By the linkage between the master cylinders 18, the front cylinders 19, the first side cylinders 20, and the second side cylinders 21 of the plurality of catching devices 2, the belt 4 can be clamped firmly, and the belt 4 can be lifted up from its both sides, so as to push both sides of the belt 4 away from the support rollers 22. In this way, some space is reserved for the lower pressing plate body 13 of each catching device 2, so as to avoid interference between the lower pressing plate body 13 and the support roller 22 during movement of the catching device 2 along with the belt 4. Further, one surface of the lower pressing plate body 13 that is far away from the upper pressing plate body 11 may be designed into an arc surface, such that the lower pressing plate body 13 can conveniently pass through the support roller 22 during movement of the catching device 2.

In the present invention, four connecting plates are welded in parallel on the bottom plate 8. The two connecting plates in the middle are a first connecting plate 23 and a second connecting plate 24; and the two connecting plates on both sides are a third connecting plate 25 and a fourth connecting plate 26.

Figure 4:
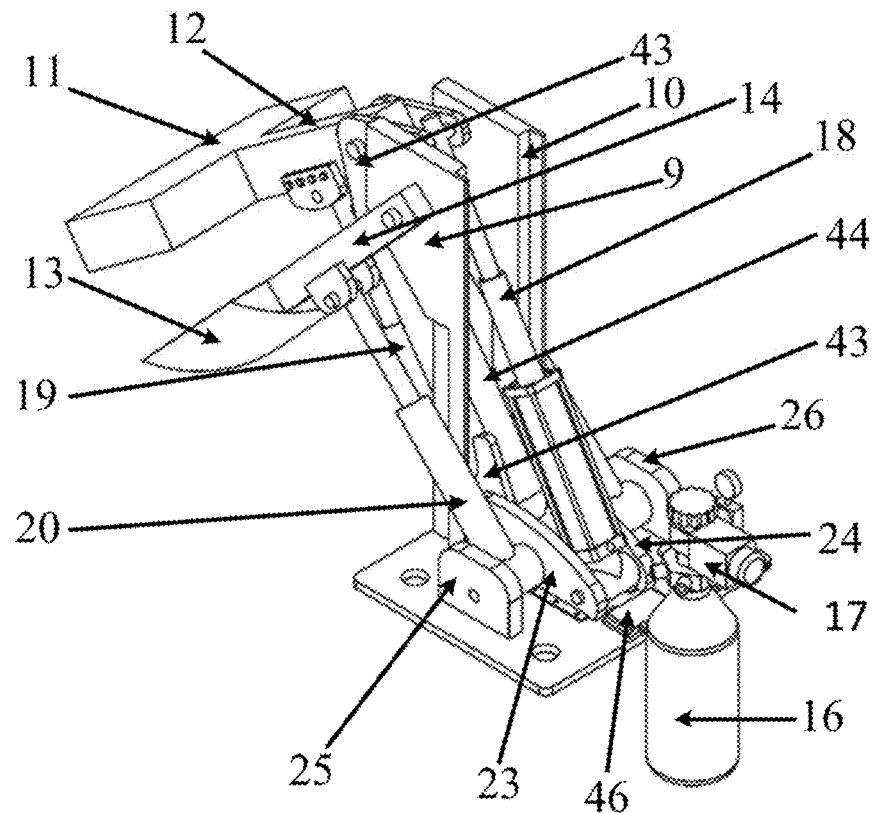
FIG. 4 shows a structural diagram of a catching mechanism of the present invention.
Figure 5:
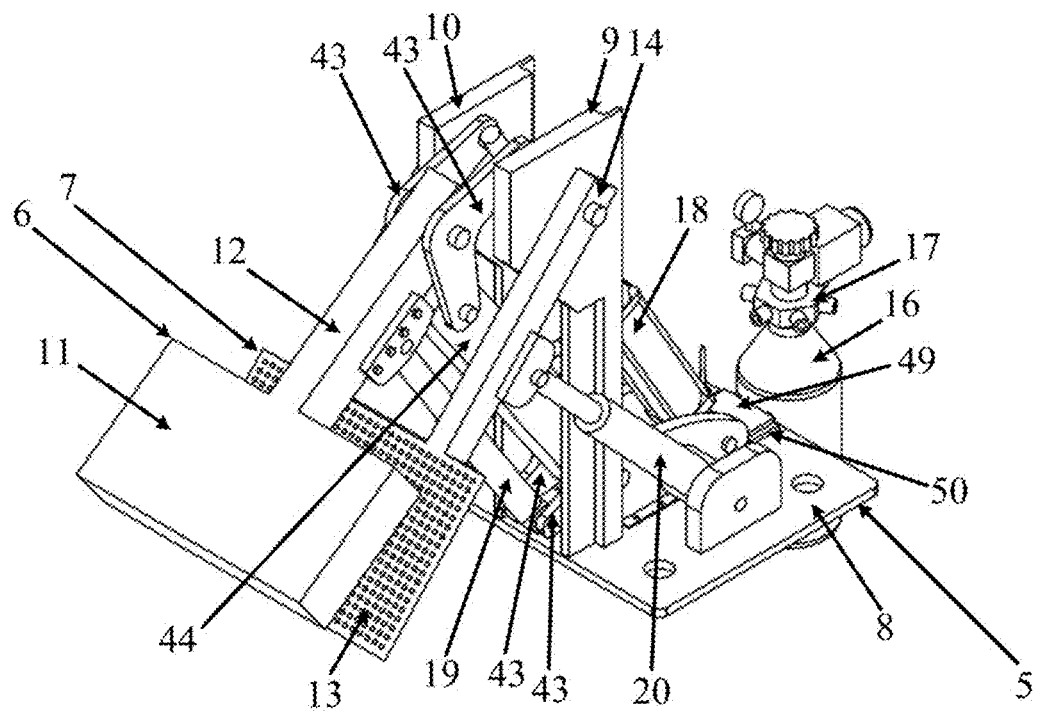
FIG. 5 shows an isometric side view of the catching mechanism of the present invention.

As shown in FIGS. 4 and 5, the bottom end of the master cylinder 18 is mounted between the first connecting plate 23 and the second connecting plate 24 via a pin. The extension end of the master cylinder 18 is rotatably connected to the other end of the first connecting part 12 via two hook-like connecting lugs 43. The two hook-like connecting lugs 43 are positioned between the first vertical plate 9 and the second vertical plate 10. The extension end of the master cylinder 18 is mounted between the two hook-like connecting lugs 43 via a pin, and the other end of the first connecting part 12 is mounted between the two hook-like connecting lugs 43 via a pin.

As shown in FIG. 5, two hook-like connecting lugs 43 may also be fixed on the bottom plate 8, and the bottom end of the front cylinder 19 is mounted between the two hook-like connecting lugs 43 on the bottom plate 8 via a pin. Because the upper pressing plate 6 moves under a joint effect of the master cylinder 18 and the front cylinder 19, a movable connecting plate 44 may be further provided to enhance the linkage effect. One end of the movable connecting plate 44 is hinged via a pin to the two hook-like connecting lugs 43 between the first vertical plate 9 and the second vertical plate 10, and the other end of the movable connecting plate 44 is hinged via a pin to the two hook-like connecting lugs 43 on the bottom plate 8.

Figure 11:
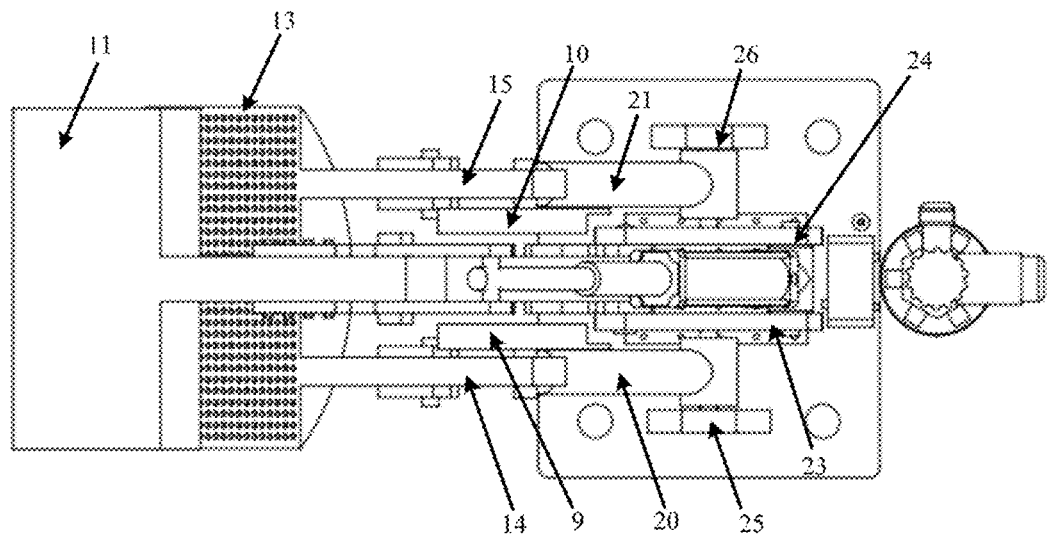
FIG. 11 shows a top view of a catching device in the present invention.

As shown in FIG. 4, the bottom end of the first side cylinder 20 is mounted between the first connecting plate 23 and the third connecting plate 25 via a pin. As shown in FIG. 11, the bottom end of the second side cylinder 21 is mounted between the second connecting plate 24 and the fourth connecting plate 26 via a pin.

Figure 7:
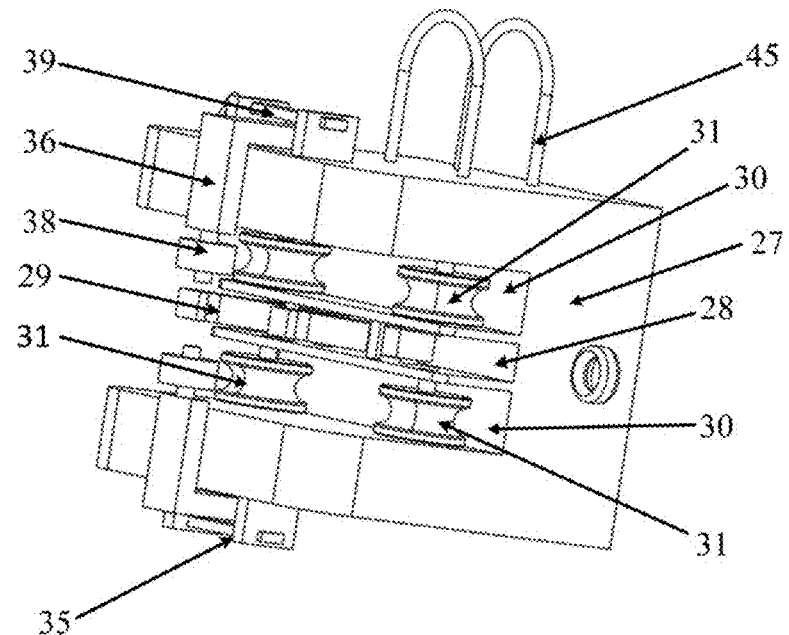
FIG. 7 shows a schematic structural diagram of the movable mechanism in the present invention.
Figure 8:
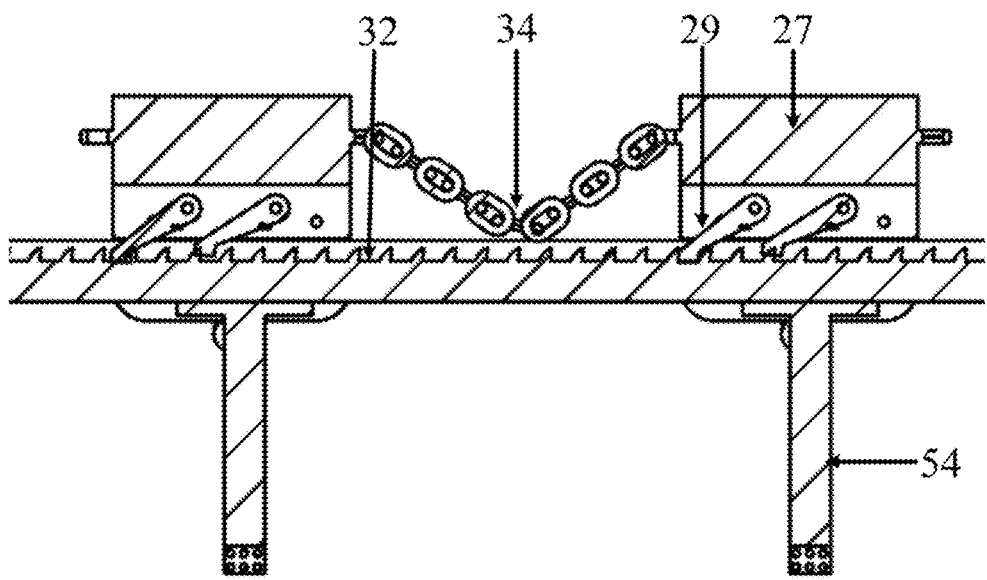
FIG. 8 shows a sectional diagram of FIG. 6.
Figure 9:
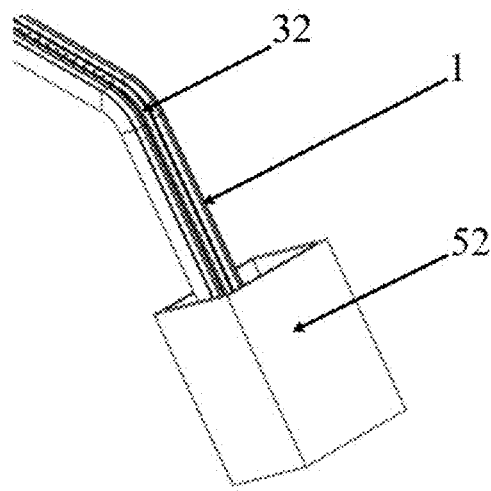
FIG. 9 shows a schematic diagram of a catching device temporary storage case in the present invention.

As shown in FIG. 7, in the present invention, the movable mechanism of each catching device 2 includes a slide rest 27, provided with three parallel slots at the bottom thereof. A plurality of stop pawls 29 is mounted in the middle slot 28 via a shaft. In this embodiment, two stop pawls 29 are mounted. A plurality of pulleys 31 is mounted in the two slots 30 on both sides via shafts. In this embodiment, two pulleys 31 are mounted in the slot on either side.

Figure 6:
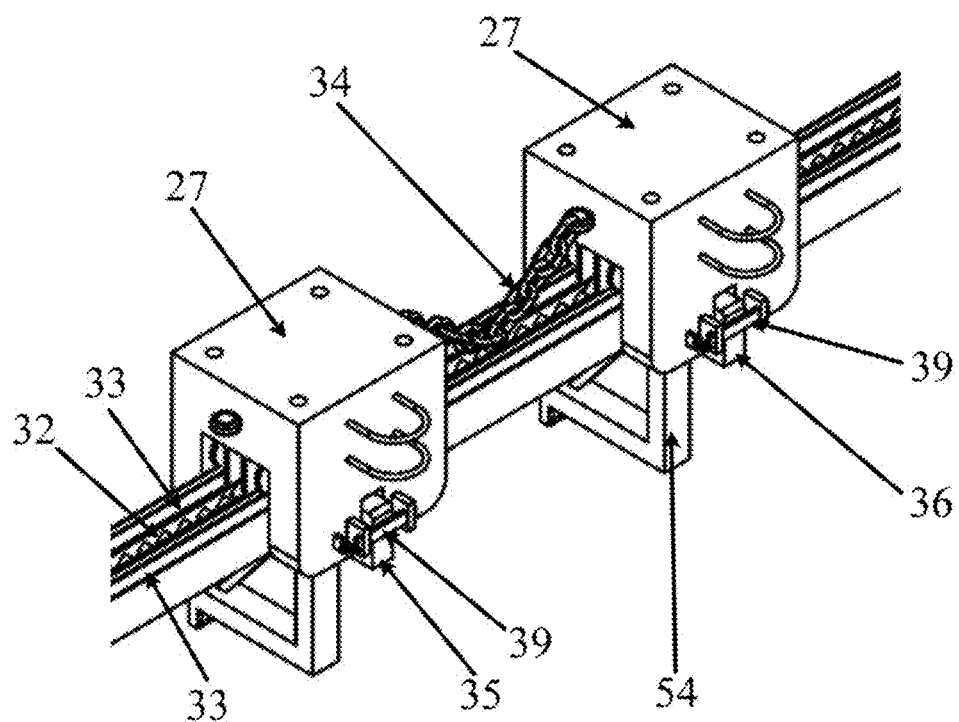
FIG. 6 shows a schematic structural diagram of a movable mechanism mounted on guide rails in the present invention.

As shown in FIG. 6, a ratchet guide rail 32 is provided in the middle of each track 1, and a pulley guide rail 33 is provided on both sides. The stop pawls 29 can unidirectionally move along the ratchet guide rail 32, and the pulleys can roll along the pulley guide rails 33.

The stop pawls 29 and the ratchet guide rail 32 form a ratchet mechanism. After the catching devices 2 firmly catch the belt 4, the belt 4 may be subjected to a large external force and the crack may be enlarged, resulting in breakage of the belt 4. In this case, the catching devices 2 on both sides of the breakage site are likely to move away from each other. Therefore, the ratchet mechanism formed by the stop pawls 29 and the ratchet guide rail 32 can guarantee that the moving devices can only run unidirectionally, avoiding the catching devices 2 on both sides of the breakage site from moving away from each other. The pulleys 31 can freely rotate, and thus the movable mechanism can move more smoothly, avoiding serious abrasion of the stop pawls 29. Further, every two adjacent movable mechanisms may be connected via a connecting chain 34. One end of the connecting chain 34 may be mounted on the slide rest 27 of one of the movable mechanisms, and the other end is mounted on the slide rest 27 of one movable mechanism adjacent to the movable mechanism. In this way, every two adjacent movable mechanisms may be constrained, to avoid opposite movement of the movable mechanisms.

Figure 10:
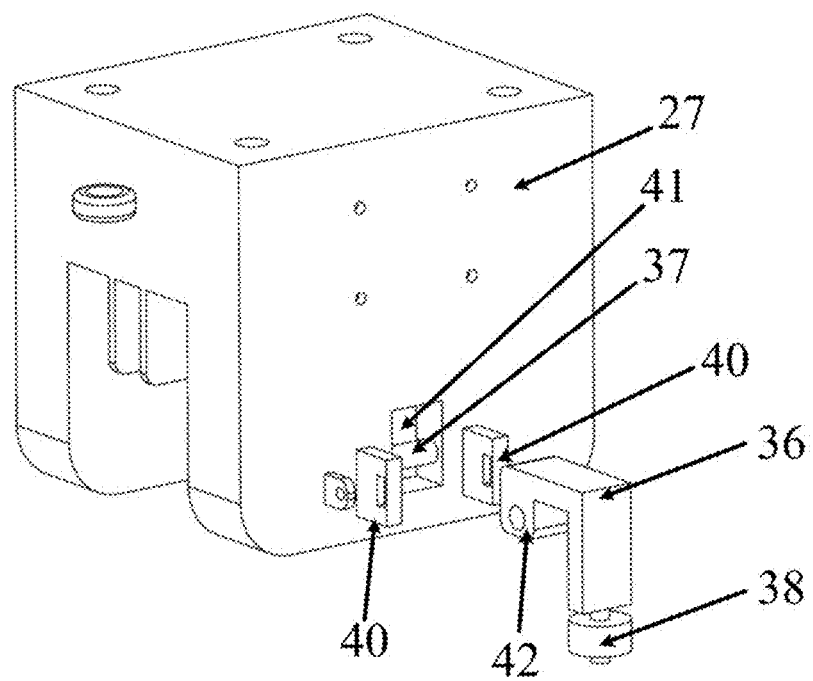
FIG. 10 shows a schematic assembled diagram of a slide rest and a roller mechanism in the present invention.

As shown in FIGS. 7 and 10, in the present invention, a roller mechanism 35 is provided on both side surfaces of the slide rest 27; and the roller mechanism 35 includes an L-shaped roller mounting bracket 36, a rotation shaft 37, a roller 38, a fixing pin 39, two limiting plates 40, and a square groove 41 provided on the side surface of the slide rest 27.

One end of the L-shaped roller mounting bracket 36 is provided with a connecting lug 42, and a shaft hole is provided on the connecting lug 42. The rotation shaft 37 passes through the shaft hole of the connecting lug 42 and two side walls of the square groove 41, so as to mount the L-shaped roller mounting bracket 36 in the square groove 41. The other end of the L-shaped roller mounting bracket 36 is rotatably connected to the roller 38. The two limiting plates 40 are mounted on the side surface of the slide rest 27, and are symmetrically provided on both sides of the square groove 41. The two ends of the fixing pin 39 are respectively inserted into the two limiting plates 40, so as to limit the L-shaped roller mounting bracket 36 and prevent the same from falling off from the square groove 41.

When the movable mechanism moves along the track 1, the rollers 38 on the two roller mechanisms 35 both roll along the track 1. As a result, on one hand, the movable mechanism can move more smoothly; on the other hand, the two L-shaped roller mounting brackets 36 on the two roller mechanisms 35 can limit the movable mechanism to guarantee its movement along the guide rails, thus preventing the movable mechanism from going off the guide rails.

In the present invention, as shown in FIG. 7 and FIG. 1, two U-shaped bolts 45 may be provided on one side of the slide rest 27 of each movable mechanism that is far away from the belt 4. The U-shaped bolts 45 are configured to fix the high-pressure tank 16 of the catching device 2.

In the present invention, the detection device includes a strain gauge, attached to the belt 4. When the belt 4 varies in shape, the strain gauge also varies in shape with the belt 4. The strain gauge is configured to measure a strain quantity of the belt 4 in real time and transmit the actually measured strain quantity to the control system. The control system internally pre-stores an ultimate strain quantity of the belt 4, the ultimate strain quantity being a strain quantity when the belt 4 has a crack. When the actually measured strain quantity reaches the ultimate strain quantity, it indicates that the belt 4 has a crack currently, and the control system controls the plurality of catching devices 2 to firmly catch the belt 4 at the same time, such that the belt 4 is caught before breakage. A plurality of strain gauges may be arranged along the length direction of the belt 4, and is configured to measure strain quantities of the belt 4 at different positions in real time. Thus, a strain quantity of the belt 4 at the position of each strain gauge on can be obtained, and a specific position where a crack occurs on the belt 4 can thus be obtained.

The detection device may also be a photoelectric sensor. The photoelectric sensors are arranged on both sides of the belt 4 in a pair. If the belt 4 has a crack, a light propagation path of this pair of photoelectric sensors is affected. Then, the photoelectric sensors generate an electric signal and transmit the electric signal to the control system. The control system controls the plurality of catching devices 2 to firmly catch the belt 4. Several pairs of photoelectric sensors may be arranged on both sides of the belt 4. Thus, a crack position on the belt 4 can be obtained according to the positions of corresponding photoelectric sensors which generate the electric signal.

As shown in FIG. 4 and FIG. 1, in the present invention, the control system includes a plurality of control modules 46, a base station 47, and an upper computer 48.

Figure 12:
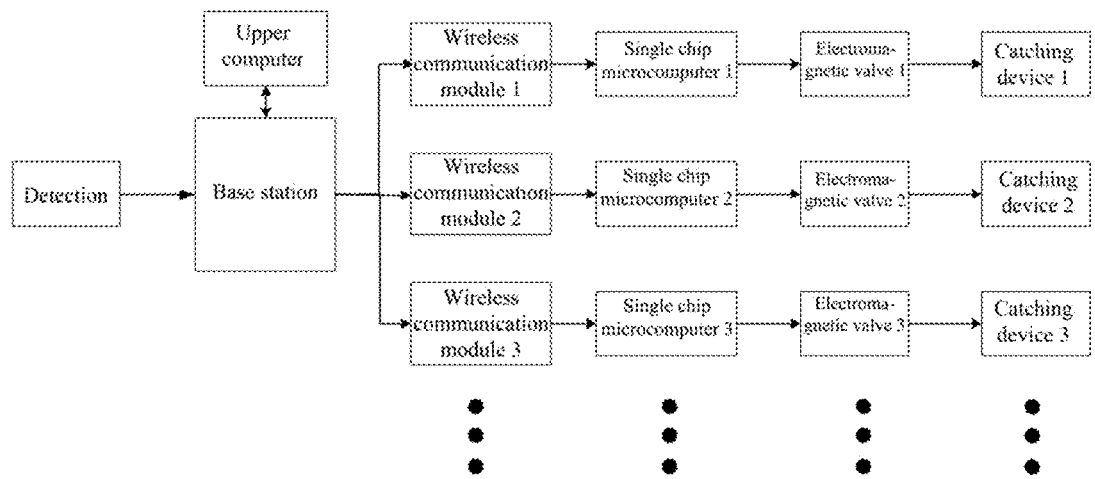
FIG. 12 shows a block diagram of hardware of a control system in the present invention.

As shown in FIGS. 4 and 5, each catching device 2 is provided with one control module 46. The control module 46 includes a single chip microcomputer 49 and a wireless communication module 50 which are electrically connected. As shown in FIG. 12, a catching principle is as follows: When the detection device detects that the belt 4 has a crack, the upper computer 48 transmits a control instruction by means of the base station 47 and the wireless communication modules 50 of the control modules 46. According to the control instruction, the single chip microcomputer 49 of each control module 46 controls the electromagnetic valve 17 of the catching device 2 where the control module is positioned, and the electromagnetic valve 17 then controls the four cylinders of the catching device 2, such that the four cylinders drive the upper pressing plate body 11 and the lower pressing plate body 13 to catch the belt 4. The single chip microcomputer used in the control module can enhance reliability and anti-interference capacity, realize accurate data reading and transmission, and achieve accurate opening and closing of the electromagnetic valve 17 of the catching device 2; and has small size, light weight, and low energy consumption. Preferably, in the present invention, the single chip microcomputer 49 of each control module 46 may also be used to directly receive the detection signal from the detection device. If the detection device detects that the belt has a crack, the single chip microcomputer 49 of each control module 46 may directly control the catching device 2 where the control module is positioned to catch the belt 4, such that the catching operation is performed more timely.

Figure 2:
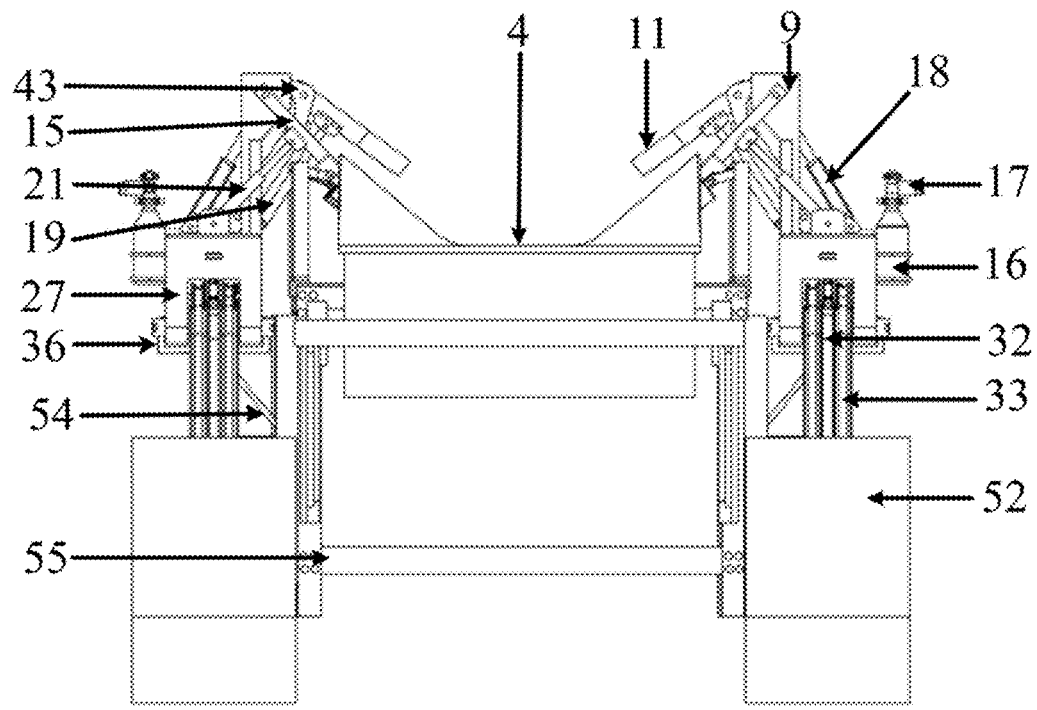
FIG. 2 shows a front view of the movable belt catching system for a movable belt breakage prevention and catching system for a belt conveyor in the present invention.
Figure 3:
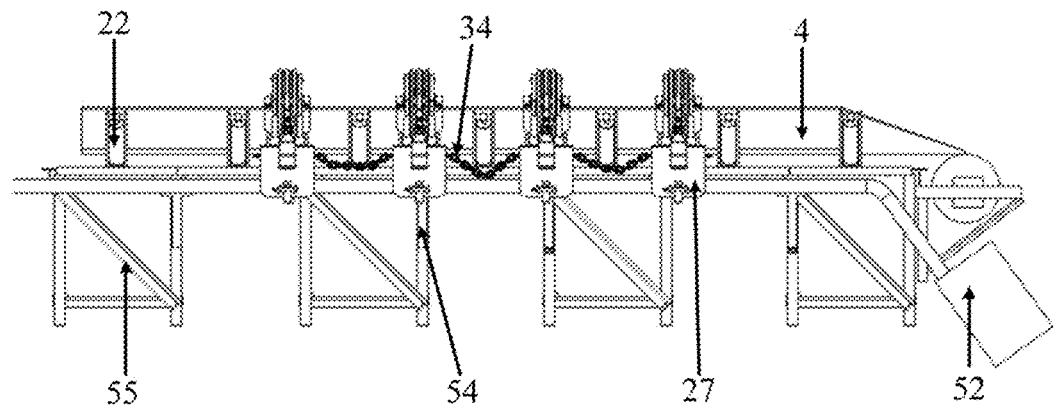
FIG. 3 shows a left view of the movable belt catching system for a movable belt breakage prevention and catching system for a belt conveyor in the present invention.

As shown in FIG. 1 to FIG. 9, in the present invention, the tail end of each track 1 may be designed into an inclined track. For the catching device 2 which moves to the tail of the belt conveyor 3 along with the belt 4, the upper computer 48 transmits a control instruction by means of the base station 47 and the wireless communication module 50 of the catching device 2. The single chip microcomputer 49 controls the electromagnetic valve 17 of the catching device 2 according to the control instruction, and the electromagnetic valve 17 then controls the four cylinders of the catching device 2, such that the four cylinders drive the upper pressing plate body 11 and the lower pressing plate body 13 to release the belt 4, thus avoiding interference between the catching device 2 and a roller 51 of the belt conveyor 3. When another catching device 2 behind the catching device 2 also moves to the tail of the belt conveyor 3 along with the belt 4, the previous catching device 2 is pushed forward to slide down along the inclined track under gravity. A catching device temporary storage case 52 may be provided on the tail end of each track 1, and is used to store the catching device 2 which slides down along the inclined track 1. The remaining catching devices 2 run in the same way, till the whole running process is completed. Before next running of the belt conveyor 3, the plurality of catching devices 2 are remounted on the two tracks 1. As shown in FIG. 2 and FIG. 3, a track mounting bracket 54 may be provided below each track 1, and is fixed on a frame 55 of the belt conveyor 3.

In the present invention, a micro camera may be provided on each catching device 2, and is used to monitor whether the catching device 2 moves to the tail of the belt conveyor 3, and transmit a monitored image to the upper computer 48. When a user 53 observes from the upper computer 48 that the catching device 2 has arrived at the tail of the belt conveyor 3, the user controls the catching device 2 to release the belt 4. From the image monitored by the micro camera, the user 53 can further observe conveyance conditions on the belt 4 at different positions, and the degree of tearing of the belt 4 where a crack occurs.

Figure 13:
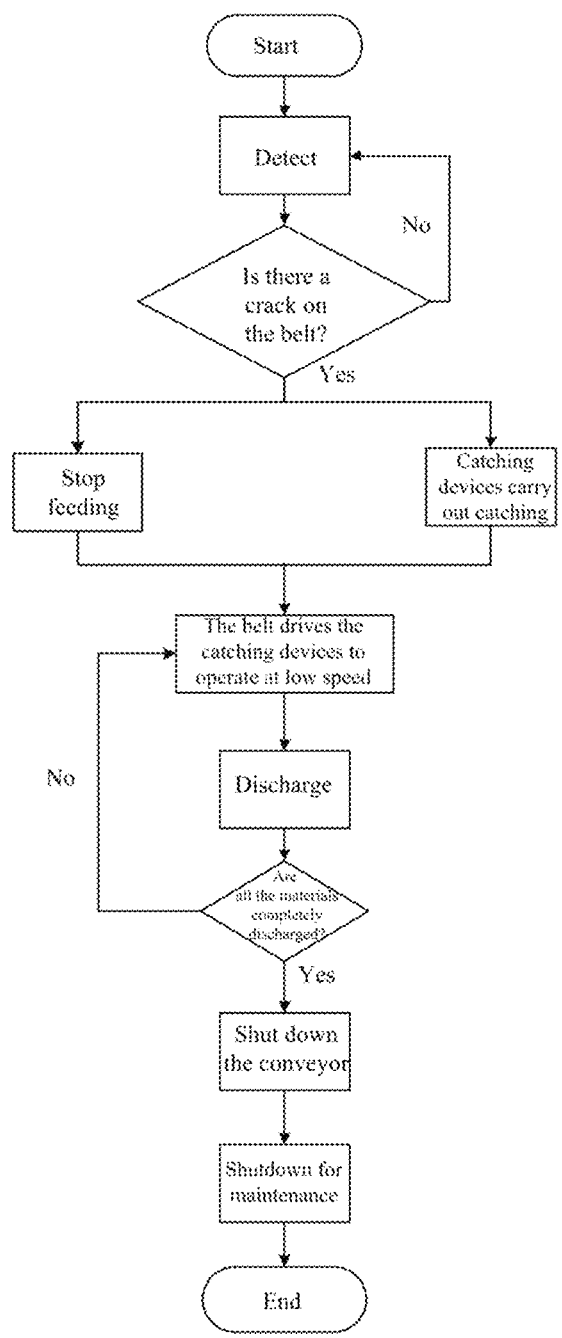
FIG. 13 shows a flowchart of operation of a movable belt breakage prevention and catching system for a belt conveyor in the present invention.

As shown in FIG. 13, an operation process of the present invention is described as follows:

1. Before running of the belt conveyor 3, the movable belt breakage prevention and catching system for the belt conveyor 3 is started, and the detection device detects the belt 4 of the belt conveyor 3 in real time.

2. When the detection device detects that the belt 4 has a crack, a feed apparatus stops feeding materials to the belt 4 of the belt conveyor, and the control system controls the plurality of catching devices 2 to immediately catch the belt 4. With the running of the belt 4 of the belt conveyor 3, the plurality of catching devices 2 move at low speed, and materials in front of the crack on the belt 4 continue to be conveyed to a next apparatus, to discharge the materials. During discharge, the control system controls the catching device 2 which moves to the tail of the belt conveyor 3 to release the belt 4, and the next catching device 2 continues to move forward to push the previous catching device 2 which has stopped catching to the catching device temporary storage case 52. The remaining catching devices 2 run in the same way.

3. After the discharge is finished, the belt conveyor 3 is shut down and then the belt 4 is repaired. The micro cameras mounted on the catching devices may be used to observe whether the materials are completely discharged from the belt 4.

The movable belt breakage prevention and catching system for a belt conveyor in the present invention has a compact structure and low cost; is easily operated, arranged and maintained; and is safe and reliable. The detection device can detect whether the belt 4 has a crack. If a crack is detected, it indicates that the belt 4 has a breakage risk, and then the control system controls the plurality of catching devices to catch the belt 4 having the crack. Thus, when a sign of breakage appears, the belt 4 can be caught before it is broken. Moreover, after firmly catching the belt 4, the plurality of catching devices can continue to run along the tracks 1 along with the belt 4. Therefore, it is not required to shut down the machine after the belt 4 is caught, and materials can continue to be conveyed with the belt 4. The present invention solves the problems in the existing catching devices of shutting down the whole conveyor after catching is carried out and manually removing the materials from the belt of the whole conveyor. Therefore, the operation of the belt 4 is not affected after the belt 4 is caught, saving a lot of manual discharge time.

Those skilled in the art should understand that, unless otherwise defined, all terms (including technical and scientific terms) used herein have the same meaning as commonly understood by one of ordinary skill in the art to which the present application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With the inspiration of the above ideal embodiments according to the present invention, based on the above description, those skilled in the art can completely make a variety of changes and modifications without deviating from the scope of the technical thought of the present invention. The technical scope of the present invention is not limited to the contents of the description, and must be determined according to the scope of the claims.

What is claimed is:

1. A movable belt breakage prevention and catching system for a belt conveyor, comprising: a detection device, two tracks, a plurality of catching devices, and a control system, wherein
    the detection device is mounted on the belt conveyor, and is configured to detect whether a belt of the belt conveyor has a crack;
    the two tracks are symmetrically arranged on both sides of the belt conveyor, and the plurality of catching devices are symmetrically arranged on the two tracks; and
    the control system is configured to control the plurality of catching devices to simultaneously catch the belt when the detection device detects that the belt has the crack; and after catching the belt, each of the plurality of catching devices is configured to unidirectionally move along with the belt along a track where the each of the plurality of catching devices is positioned.

2. The movable belt breakage prevention and catching system for a belt conveyor according to claim 1, wherein each of the plurality of catching devices comprises a catching mechanism and a movable mechanism;
    the catching mechanism comprises a mounting bracket, an upper pressing plate, a lower pressing plate, and a drive mechanism located on the mounting bracket; the upper pressing plate and the lower pressing plate are both connected to the drive mechanism, and the upper pressing plate is positioned above the lower pressing plate;
    the control system is configured to control the drive mechanism to drive the upper pressing plate to move towards the lower pressing plate, and to drive the lower pressing plate to move towards the upper pressing plate, such that the upper pressing plate and the lower pressing plate clamp the belt;
    the control system is configured to control the drive mechanism to drive the upper pressing plate to move away from the lower pressing plate, and to drive the lower pressing plate to move away from the upper pressing plate, such that the upper pressing plate and the lower pressing plate release the belt; and
    the mounting bracket is mounted on the movable mechanism, and the movable mechanism is configured to unidirectionally move along the track.

3. The movable belt breakage prevention and catching system for a belt conveyor according to claim 2, wherein the mounting bracket comprises a bottom plate and two vertical plates, the two vertical plates being symmetrically mounted on the bottom plate, the two vertical plates being a first vertical plate and a second vertical plate;
    the drive mechanism is mounted on the bottom plate;
    the upper pressing plate comprises an upper pressing plate body and a first connecting part; one end of the first connecting part is connected to one side of the upper pressing plate body, and an other end of the first connecting part is positioned between the two vertical plates; and the first connecting part is connected to the drive mechanism; and
    the lower pressing plate comprises a lower pressing plate body, a second connecting part, and a third connecting part; one end of the second connecting part and one end of the third connecting part are connected to a same side of the lower pressing plate body; an other end of the second connecting part is hinged to one side of the first vertical plate, wherein the one side of the first plate is a side far away from the second vertical plate as compared to an other side of the first vertical plate; the other end of the third connecting part is hinged to one side of the second vertical plate, wherein the one side of the second vertical plate is a side of the second vertical plate far away from the first vertical plate as compared to an other side of the second vertical plate; and the second connecting part and the third connecting part are both connected to the drive mechanism.

4. The movable belt breakage prevention and catching system for a belt conveyor according to claim 3, wherein the drive mechanism comprises a high-pressure tank, an electromagnetic valve arranged at an opening of the high-pressure tank, a master cylinder, a front cylinder, a first side cylinder, and a second side cylinder; the electromagnetic valve is connected to the master cylinder, the front cylinder, the first side cylinder, and the second side cylinder;
    a bottom end of the master cylinder is rotatably connected to the bottom plate, and an extension end of the master cylinder is rotatably connected to the other end of the first connecting part;
    a bottom end of the front cylinder is rotatably connected to the bottom plate, and an extension end of the front cylinder is hinged between two ends of the first connecting part;

a bottom end of the first side cylinder is rotatably connected to the bottom plate, and an extension end of the first side cylinder is hinged between the two ends of the second connecting part; and a bottom end of the second side cylinder is rotatably connected to the bottom plate, and an extension end of the second side cylinder is hinged between the two ends of the third connecting part.

5. The movable belt breakage prevention and catching system for a belt conveyor according to claim 4, wherein the control system comprises a plurality of control modules, a base station, and an upper computer;

each of the plurality of catching devices is provided with one of the plurality of control modules, and each control module comprises a single chip microcomputer and a wireless communication module electrically connected with the single chip microcomputer; when the detection device detects that the belt has the crack, the upper computer transmits a control instruction by means of the base station and the wireless communication modules of the control modules; and according to the control instruction, the single chip microcomputer of each of the plurality of control modules control the each of the plurality of catching devices wherein the control module is positioned to catch the belt.

6. The movable belt breakage prevention and catching system for a belt conveyor according to claim 3, wherein one surface of the lower pressing plate body is an arc surface, the arc surface is a surface of the lower pressing plate far away from the upper pressing plate body as compared to an other surface of the lower pressing plate.

7. The movable belt breakage prevention and catching system for a belt conveyor according to claim 6, wherein the control system comprises a plurality of control modules, a base station, and an upper computer;

each of the plurality of catching devices is provided with one of the plurality of control modules, and each control module comprises a single chip microcomputer and a wireless communication module electrically connected with the single chip microcomputer; when the detection device detects that the belt has the crack, the upper computer transmits a control instruction by means of the base station and the wireless communication modules of the control modules; and according to the control instruction, the single chip microcomputer of each of the plurality of control modules control the each of the plurality of catching devices wherein the control module is positioned to catch the belt.

8. The movable belt breakage prevention and catching system for a belt conveyor according to claim 3, wherein the control system comprises a plurality of control modules, a base station, and an upper computer;

each of the plurality of catching devices is provided with one of the plurality of control modules, and each control module comprises a single chip microcomputer and a wireless communication module electrically connected with the single chip microcomputer; when the detection device detects that the belt has the crack, the upper computer transmits a control instruction by means of the base station and the wireless communication modules of the control modules; and according to the control instruction, the single chip microcomputer of each of the plurality of control modules control the each of the plurality of catching devices wherein the control module is positioned to catch the belt.

9. The movable belt breakage prevention and catching system for a belt conveyor according to claim 2, wherein the movable mechanism comprises a slide rest, the slide rest is provided with three parallel slots at a bottom thereof; and a plurality of stop pawls are mounted in a middle slot, and a plurality of pulleys are mounted in two slots on both sides; and a ratchet guide rail is provided in a middle of each of the two tracks, and a pulley guide rail is provided on both sides; and the stop pawls are configured to unidirectionally move along the ratchet guide rail, and the pulleys are configured to roll along the pulley guide rails.

10. The movable belt breakage prevention and catching system for a belt conveyor according to claim 9, wherein the control system comprises a plurality of control modules, a base station, and an upper computer;

each of the plurality of catching devices is provided with one of the plurality of control modules, and each control module comprises a single chip microcomputer and a wireless communication module electrically connected with the single chip microcomputer; when the detection device detects that the belt has the crack, the upper computer transmits a control instruction by means of the base station and the wireless communication modules of the control modules; and according to the control instruction, the single chip microcomputer of each of the plurality of control modules control the each of the plurality of catching devices wherein the control module is positioned to catch the belt.

11. The movable belt breakage prevention and catching system for a belt conveyor according to claim 2, wherein every two adjacent movable mechanisms are connected via a connecting chain.

12. The movable belt breakage prevention and catching system for a belt conveyor according to claim 11, wherein the control system comprises a plurality of control modules, a base station, and an upper computer;

each of the plurality of catching devices is provided with one of the plurality of control modules, and each control module comprises a single chip microcomputer and a wireless communication module electrically connected with the single chip microcomputer; when the detection device detects that the belt has the crack, the upper computer transmits a control instruction by means of the base station and the wireless communication modules of the control modules; and according to the control instruction, the single chip microcomputer of each of the plurality of control modules control the each of the plurality of catching devices wherein the control module is positioned to catch the belt.

13. The movable belt breakage prevention and catching system for a belt conveyor according to claim 2, wherein the control system comprises a plurality of control modules, a base station, and an upper computer;

each of the plurality of catching devices is provided with one of the plurality of control modules, and each control module comprises a single chip microcomputer and a wireless communication module electrically connected with the single chip microcomputer; when the detection device detects that the belt has the crack, the upper computer transmits a control instruction by means of the base station and the wireless communication modules of the control modules; and according to the control instruction, the single chip microcomputer of each of the plurality of control modules control the each of the plurality of catching devices wherein the control module is positioned to catch the belt.

14. The movable belt breakage prevention and catching system for a belt conveyor according to claim 1, wherein a catching device temporary storage case is provided on a tail end of each of the two tracks.

15. The movable belt breakage prevention and catching system for a belt conveyor according to claim 14, wherein the control system comprises a plurality of control modules, a base station, and an upper computer;

each of the plurality of catching devices is provided with one of the plurality of control modules, and each control module comprises a single chip microcomputer and a wireless communication module electrically connected with the single chip microcomputer; when the detection device detects that the belt has the crack, the upper computer transmits a control instruction by means of the base station and the wireless communication modules of the control modules; and according to the control instruction, the single chip microcomputer of each of the plurality of control modules control the each of the plurality of catching devices wherein the control module is positioned to catch the belt.

16. The movable belt breakage prevention and catching system for a belt conveyor according to claim 1, wherein the detection device comprises a strain gauge, the strain gauge is attached to the belt, and configured to measure a strain quantity of the belt in real time and transmit an actually measured strain quantity to the control system; the control system internally pre-stores an ultimate strain quantity of the belt, the ultimate strain quantity is the strain quantity when the belt has the crack; and when the actually measured strain quantity reaches the ultimate strain quantity, the control system controls the plurality of catching devices to catch the belt at a same time.

17. The movable belt breakage prevention and catching system for a belt conveyor according to claim 16, wherein the control system comprises a plurality of control modules, a base station, and an upper computer;

each of the plurality of catching devices is provided with one of the plurality of control modules, and each control module comprises a single chip microcomputer and a wireless communication module electrically connected with the single chip microcomputer; when the detection device detects that the belt has the crack, the upper computer transmits a control instruction by means of the base station and the wireless communication modules of the control modules; and according to the control instruction, the single chip microcomputer of each of the plurality of control modules control the each of the plurality of catching devices wherein the control module is positioned to catch the belt.

18. The movable belt breakage prevention and catching system for a belt conveyor according to claim 1, wherein the control system comprises a plurality of control modules, a base station, and an upper computer;

each of the plurality of catching devices is provided with one of the plurality of control modules, and each control module comprises a single chip microcomputer and a wireless communication module electrically connected with the single chip microcomputer; when the detection device detects that the belt has the crack, the upper computer transmits a control instruction by means of the base station and the wireless communication modules of the control modules; and according to the control instruction, the single chip microcomputer of each of the plurality of control modules control the each of the plurality of catching devices wherein the control module is positioned to catch the belt.

\* \* \* \* \*